United States Patent
Meyassed et al.

(10) Patent No.: US 10,511,824 B2
(45) Date of Patent: Dec. 17, 2019

(54) SYSTEM DEVICE AND METHODS FOR ASSISTANCE IN CAPTURING STEREOSCOPIC VIDEO OR IMAGES

(71) Applicant: 2Sens Ltd., Tel-Aviv (IL)

(72) Inventors: Moshe Meyassed, Kadima (IL); Osnat Goren-Peyser, Tel-Aviv (IL)

(73) Assignee: 2SENS LTD., Tel-Aviv (IL)

( * ) Notice: Subject to any disclaimer, the term of this patent is extended or adjusted under 35 U.S.C. 154(b) by 65 days.

(21) Appl. No.: 15/869,348

(22) Filed: Jan. 12, 2018

(65) Prior Publication Data

US 2018/0205945 A1    Jul. 19, 2018

Related U.S. Application Data

(60) Provisional application No. 62/446,885, filed on Jan. 17, 2017.

(51) Int. Cl.

| | |
|---|---|
| *H04N 13/128* | (2018.01) |
| *H04N 13/117* | (2018.01) |
| *H04N 13/167* | (2018.01) |
| *H04N 5/232* | (2006.01) |
| *G06T 7/285* | (2017.01) |
| *G06T 7/80* | (2017.01) |
| *H04N 13/00* | (2018.01) |

(52) U.S. Cl.
CPC ....... *H04N 13/128* (2018.05); *H04N 5/23293* (2013.01); *H04N 13/117* (2018.05); *H04N 13/167* (2018.05); *G06T 7/285* (2017.01); *G06T 7/85* (2017.01); *H04N 2013/0085* (2013.01); *H04N 2213/002* (2013.01)

(58) Field of Classification Search
None
See application file for complete search history.

(56) References Cited

U.S. PATENT DOCUMENTS

| | | | |
|---|---|---|---|
| 2006/0216012 A1* | 9/2006 | Kuo | G03B 13/20 396/106 |
| 2010/0141735 A1* | 6/2010 | Yamashita | H04N 5/232 348/36 |
| 2012/0084652 A1* | 4/2012 | Martinez Bauza | H04N 13/167 715/719 |
| 2012/0224031 A1* | 9/2012 | Yamanaka | G03B 35/04 348/47 |
| 2014/0139429 A1* | 5/2014 | Menadeva | G06F 3/017 345/156 |
| 2015/0271567 A1* | 9/2015 | Michot | H04N 21/4312 348/47 |
| 2016/0114905 A1* | 4/2016 | Derenick | G06K 9/0063 701/16 |

* cited by examiner

*Primary Examiner* — Edemio Navas, Jr.
(74) *Attorney, Agent, or Firm* — Browdy and Neimark, P.L.L.C.

(57) ABSTRACT

A device system and methods comprising receiving a stereoscopic video or image of a scene including two perspective data streams (e.g. left and right) captured for example by a stereoscopic sensing device and analyzing the received stereoscopic video or image to yield stereoscopic discomfort data to assist a user to capture a stereoscopic 3D video of the scene, the stereoscopic discomfort data associated with discomfort effects such as dizziness, nausea, and eye stress.

20 Claims, 7 Drawing Sheets

SYSTEM DEVICE AND METHODS FOR ASSISTANCE IN CAPTURING STEREOSCOPIC VIDEO OR IMAGES

CROSS-REFERENCE

The present application claims the benefit of U.S. Provisional Application Ser. No. 62/446,885 filed on Jan. 17, 2017, entitled "Live Assistance of 3D Stereoscopic Video Capturing for VR Headset" which is incorporated herein by reference in its entirety.

TECHNICAL FIELD

The present invention relates generally to stereoscopic video or image capturing and more particularly, to a device system and methods for real time assistance in capturing stereoscopic images or video, for example for near-eye display such as VR or AR headsets.

BACKGROUND OF THE INVENTION

Prior to the background of the invention being set forth, it may be helpful to set forth definitions of certain terms that will be used hereinafter.

The term 'stereoscopic artifacts' as used herein are defined as one or more discomfort effects which might occur while watching a stereoscopic image or video, causing for example dizziness, nausea, eye-strain, etc.

The term 'Virtual Reality' (VR) as used herein is defined as a computer-generated environment that can generate physical presence in places in the real world or imagined worlds. Virtual reality could recreate sensory experiences, including virtual taste, sight, smell, sound, touch, and the like. Many traditional VR systems use a near eye display for presenting a 3D virtual environment.

The term 'Augmented Reality' (AR) as used herein is defined as a live direct or indirect view of a physical, real-world environment with elements that are augmented (or supplemented) by computer-generated sensory input such as video, graphics or GPS data. In some cases AR may be related mediated reality, in which a view of reality is modified (possibly even diminished rather than augmented), by a computer.

The term 'near eye display' as used herein is defined as a device which includes wearable projected displays, usually stereoscopic in the sense that each eye is presented with a slightly different field of view so as to create the 3D perception.

The term 'virtual reality headset' sometimes called 'goggles', is a wrap-around visual interface to display video or computer output. Commonly the computer display information is presented as a three-dimensional representation of real-world environments. The goggles may or may not include optics beyond the mere structure for holding the computer display (possibly in a form of a smartphone).

The use of stereoscopic 3D video photography in various fields is dramatically growing. Filmmakers, game developers as well as social mobile video platforms and live-streaming options on online video platforms, are all utilizing the visual benefits of stereoscopic 3D video photography over traditional two dimensional (2D) video. Accordingly, various technologies such as applications and systems for capturing and generating 3D stereoscopic video are developed to provide users with tools to create a stereoscopic 3D video.

Traditional three-dimensional image or video capture devices, such as digital cameras and video recorders include creating a 3D illusion by a pair of 2D images or videos. Shooting a stereoscopic 3D video, is fundamentally different and more challenging from traditional 2D video capturing. Stereoscopic 3D video photography has its rules and benchmarks. Keeping these rules and measures is fundamental to avoid discomfort artifacts in the resulted 3D video. These phenomena include for example dizziness, nausea, eye-strain, etc.

While professional 3D photographers are well aware of these rules a layman photographer will find it difficult and time-intensive to figure out how a stereoscopic 3D should be captured to avoid these discomfort artifacts.

SUMMARY OF THE INVENTION

According to a first embodiment there is provided a device connectable to a portable computing platform having a processor, the device comprising: a stereoscopic camera comprising two cameras, the cameras located at a distance from one another, wherein the stereoscopic camera is configured to provide two perspective data streams of a scene, and wherein the processor is configured to: analyze the two perspective data streams based on predefined stereoscopic discomfort data to yield one or more stereoscopic discomfort parameters; provide a depth map of said scene based on the two perspective data streams; provide a stereoscopic discomfort module, said stereoscopic discomfort module is configured to analyze said depth map and discomfort parameters to yield stereoscopic discomfort data to assist a user to capture a stereoscopic 3D video of said scene.

In many embodiments, the device is connectable to a display and wherein the stereoscopic discomfort data is displayed on said display.

In many embodiments, the stereoscopic discomfort data comprise one or more alerts, said alerts indicating one or more predicted discomfort artifacts.

In many embodiments, the stereoscopic discomfort module is configured to compute the velocity of the stereoscopic camera.

In many embodiments, the stereoscopic discomfort module is configured to compute the panning velocity of the device or a vertical movement of the device.

In many embodiments, the stereoscopic discomfort module is configured to compute a distance between the nearest object in the captured scene and the device.

In many embodiments, the distance is displayed and used to assist a user in capturing the scene.

In many embodiments, the one or more measurements units are configured to measure the position of the stereoscopic camera and yield location measurement data.

In many embodiments, the one or more measurement units are Inertial Measurement Units (IMU) configured to detect and provide said measurements data, and wherein said measurements data comprise the device linear acceleration and rotational rate.

In many embodiments, the stereoscopic discomfort module is configured to detect a movement towards or away from the stereoscopic camera in the respective optical axis of one or more objects in the scene.

In many embodiments, the movement towards or away from the camera is detected by analyzing the rate of change in the depth map within consecutive frames of said two perspective data streams of a scene.

In many embodiments, the stereoscopic discomfort module is configured to compute shakes or vibrations of the stereoscopic camera.

In many embodiments, the stereoscopic discomfort data comprise one or more guidelines.

In many embodiments, the guidelines comprise one or more visual indicators or voice indicators.

In many embodiments, the visual indicators are selected from the group consisting of: arrows; speed scale; textual alerts; or guidance.

In many embodiments, the display is a headset display.

In many embodiments, the display is a virtual reality headset.

In accordance with a second embodiment of the invention there is provided a machine-readable non-transitory medium encoded with executable instructions for detecting or preventing stereoscopic artifacts such as discomfort artifacts in a captured stereoscopic image or video, the instructions comprising code for: receiving current video or image data from a sensing device, the current video image data being associated with a current pose of the sensing device and comprises two perspective data streams of a scene; analyzing the two perspective data streams based on predefined stereoscopic discomfort data rules to yield one or more stereoscopic discomfort parameters; generating a depth map of the captured scene; analyzing said depth map and said one or more stereoscopic discomfort parameters to yield stereoscopic discomfort data to assist a user to capture a stereoscopic 3D video of said scene.

These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1A:
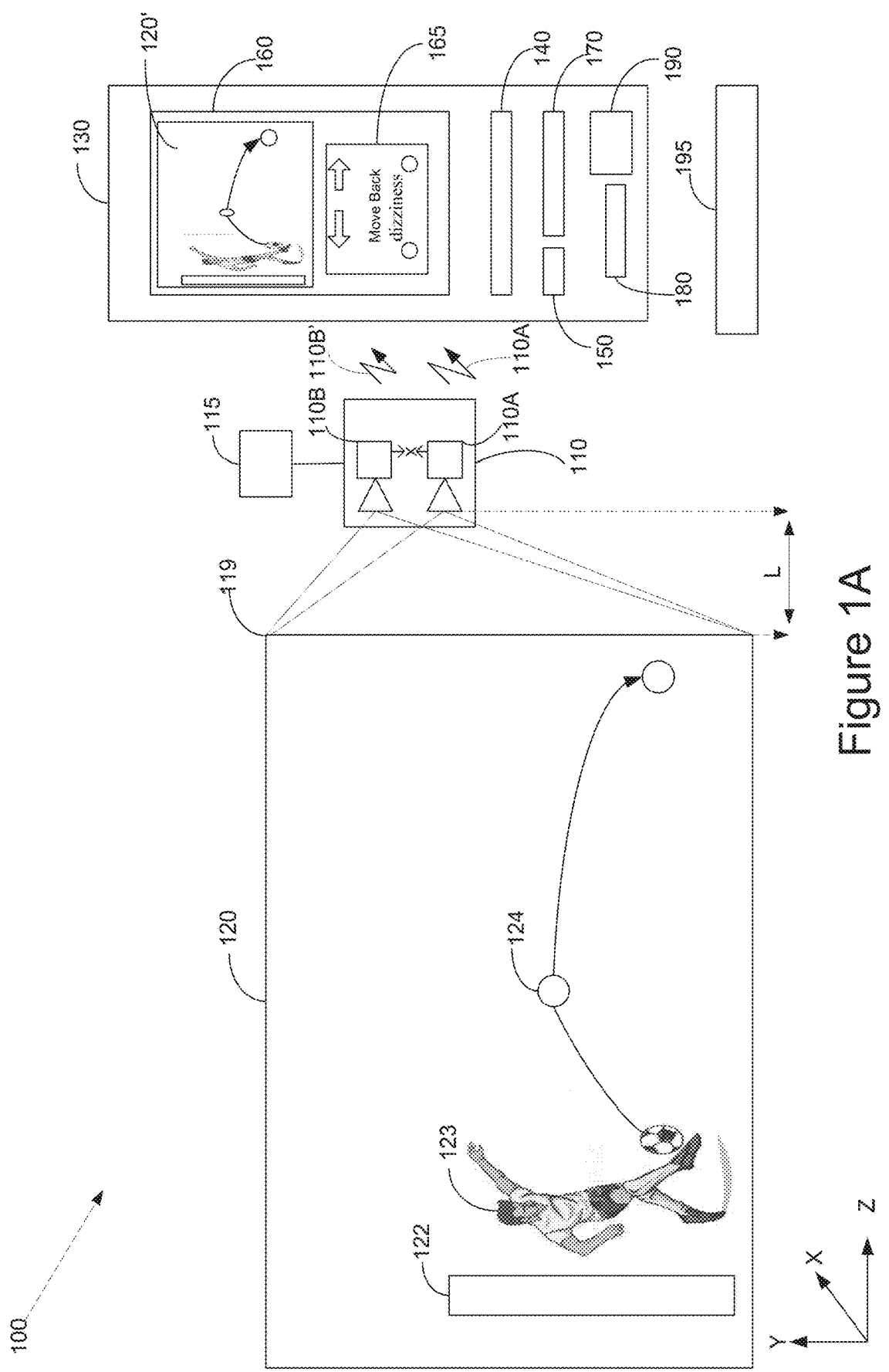
FIG. 1A is a block diagram illustrating a system and methods for assisting a user in capturing images or video of a scene by a stereoscopic sensing device, in accordance with embodiments.

As explained above, the present invention relates generally to stereoscopic video or image capturing and more particularly, but not exclusively, to devices systems and methods for real time assistance in capturing stereoscopic images or videos for example for near-eye display such as VR or AR headsets.

The devices systems and methods, in accordance with embodiments, are configured to receive a stereoscopic video or image of a scene including two perspective data streams (e.g. left and right) captured for example by a stereoscopic sensing device and analyze the received stereoscopic video or image to yield data such as stereoscopic discomfort data including one or more parameters associated with discomfort effects such as dizziness, nausea, and eye stress. According to another embodiment there are provided devices systems and methods configured to analyze the captured stereoscopic video of the scene to identify, for example in real time, the cause of each of the discomfort effects and provide information to the user such as one or more guidelines including for example visual or voice alerts or indicators to assist the user to generate a stereoscopic video which will not include stereoscopic discomfort effects and therefore comfort to watch.

According to some embodiments there are provided systems and methods for detecting the cause of dizziness in a captured stereoscopic video of a scene and provide one or more alerts or guidelines to avoid dizziness. The system and method comprises detecting a fast horizontal movement (e.g. panning) which causes dizziness. The detection includes analyzing the captured video to detect whether the movement is caused by the stereoscopic camera and therefore alert the user to pan slower or if it is caused by one or more captured objects in the scene moving fast and therefore direct the user to step back and/or zoom out.

According to some embodiments there are provided systems and methods for detecting cause of nausea in a captured stereoscopic video of a scene and provide one or more alerts or guidelines to avoid nausea effects. The system and method comprise detecting a fast vertical movement which causes nausea. The detection includes analyzing the captured stereoscopic video to detect whether the movement is caused by the stereoscopic camera and therefore alert the user to move slower or if it is caused by one or more captured objects in the scene moving fast and therefore direct the user to step back and/or zoom out. In some cases, the stereoscopic camera vertical movement is detected from camera position in the last few frames and object position and movement are calculated from scene depth map in the last few frames and extracting it from the camera global motion.

According to some embodiments, there are provided systems and methods for detecting vergence-accommodation conflict effect which causes eye stress while viewing the captured stereoscopic video of a scene and provide one or more alerts or guidelines to avoid causing eye stress effect while imaging the respected scene. The system and method comprises detecting the distance of a nearest object in the captured scene from the stereoscopic camera. The detection includes analyzing the captured video to detect if the movement is caused by the stereoscopic camera and therefore alert the user to move slower or if it is caused by one or more captured objects in the scene moving fast and therefore direct the user to step back and/or zoom out With specific reference now to the drawings in detail, it is stressed that the particulars shown are by way of example and for purposes of illustrative discussion of the preferred embodiments of the present technique only, and are presented in the cause of providing what is believed to be the most useful and readily understood description of the principles and conceptual aspects of the present technique. In this regard, no attempt is made to show structural details of the present technique in more detail than is necessary for a fundamental understanding of the present technique, the description taken with the drawings making apparent to those skilled in the art how the several forms of the invention may be embodied in practice.

Before at least one embodiment of the present technique is explained in detail, it is to be understood that the invention is not limited in its application to the details of construction and the arrangement of the components set forth in the following description or illustrated in the drawings. The present technique is applicable to other embodiments or of being practiced or carried out in various ways. Also, it is to be understood that the phraseology and terminology employed herein is for the purpose of description and should not be regarded as limiting.

FIG. 1A is a block diagram illustrating an example of system 100 for assisting a user in capturing images or video of a scene 120 by a stereoscopic sensing device 110 (e.g. stereoscopic camera), in accordance with embodiments. The stereoscopic sensing device 110 includes two sensors such as respective cameras 110A and 110B either fixed or configured to move to achieve convergence. In some cases, the cameras 110A and 120B may be RGB or monochrome cameras, Each camera comprises lens which may form an image on a light sensitive sensor such as a CCD array. The sensing device 110 is configured to move in space for capturing stereoscopic images or videos of the scene 120 from all possible angles.

According to embodiments, camera 110A provides captured data such as video streams (e.g. RGB streams) of the left perspective viewpoint 110A' of the scene 120 and camera 110B provides captured data such as video streams (e.g. RGB streams) of the right perspective viewpoint 110B' of the scene 120. The camera lenses are separated by distance X and the distance from the cameras, or their lenses, to the plane of convergence, in the visual world is given by distance L. The two cameras' fields of view coincide on rectangular area 119, with the axes of the two lenses crossing at the intersection of lines X and Y of axis X-Y-Z. An object intersecting plane 119 will be imaged to appear in the plane of the display screen, such as a near eye display 195.

According to some embodiments, the sensing device 110 may include or may be in communication with device 130 which may comprise, for example, desktop, laptop, or tablet computers, media consoles, personal digital assistants or smart phones, or any other sort of device which may be for example connectable to the network, and comprises video and audio interfaces and computing capabilities needed to interact with sensing device 110 for example wirelessly or via a wire connection (e.g. via ports such as USB ports). By way of example, device 130 may comprise a computer with one or more processing units 140, memory 150, video display 160 and speakers 170 for playing and displaying captured stereoscopic video 120' of the captured scene 120, along with another video camera and microphone.

Advantageously, device 110 provides merely the minimal hardware such as the cameras 110A and 110B for capturing a stereoscopic image of the scene 120. In some cases, the interface connecting to device 130 may supply the necessary power and transfer the data acquired to device 130, where all the processing is being carried out, taking advantage of its computing power. Thus, in accordance with some embodiments, installing a VR or AR system becomes very easy and using off-the-shelf components such as smart telephones and goggles.

According to some embodiments the system may include a virtual reality (VR) or AR headset (goggles), such as a VR HMD, AR glasses, 3D TV, 3D cinema or a near eye display configured to project a synthetic 3D scene and interface with a mobile device 130. Devices 110 and 130 are further configured to physically and electronically interface with the near eye display 195 that form together the VR or AR headset. Such a VR headset (goggles) may be arranged for use with smartphones, as is known in the art, and usually includes optics which can transmit the display of the smartphone, a sleeve for accommodating smartphone and a strap for fastening the VR headset (goggles) onto the head of the user. It is understood however that devices 110 and 130 may interface with near eye displays such as Samsung Gear VR™ and Oculus Rift™. Ergonomically, some embodiments of the present invention eliminate the need for a VR specific device and will further save costs.

In some embodiments the system 100 may further comprise one or more measurement units 115 such as Inertial Measurement Units (IMU) configured to detect and provide measurements data relating to the sensing device, including for example the sensing device 110 or device 130 linear acceleration and rotational rate using one or more accelerometers and one or more gyroscopes.

According to some embodiments, the system 100 comprises a stereoscopic discomfort module 180 configured to generate stereoscopic discomfort data 190 including information on discomfort stereoscopic effects. In some cases, stereoscopic discomfort data 190 includes guidelines, metadata, summary and corrected video/images (as will be illustrated in details in respect to FIG. 4) to assist the user with capturing the scene 120 by directing the user, for example in real time, to specific locations where the 3D video should be captured and/or alerting not to proceed capturing the scene from one or more specific locations and/or in which specific pose to hold the stereoscopic sensing device 110 to avoid discomfort effects or artifacts, such as dizziness, nausea, eye-strain in the captured 3D video or image. In some cases, the stereoscopic discomfort module 180 may be executable by one or more processors such as the processing units 140. Specifically, in accordance with embodiments, the stereoscopic discomfort module 180 is configured to receive the two perspective data streams 110A' and 110B' of the captured scene and analyze, for example each of the two perspective data streams based on predefined data including stereoscopic discomfort rules, stored for example in the device's memory storage 150 and executable by the processor to yield one or more stereoscopic discomfort parameters; a depth map of the scene 120 based on the two perspective data streams 110A and 110B; and a stereoscopic discomfort data 190 (based on said depth map and discomfort parameters) to assist a user to capture a stereoscopic 3D video of said scene. These modules may be in communication with one another.

In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Optionally, the modules such as the stereoscopic discomfort module 180 and/or the stereoscopic discomfort data 190 can be integrated into one or more cloud based servers.

According to some embodiments, as illustrated in FIG. 1A the scene 120 may include static objects and moving objects which continually move, roam and shake in space in respect to the 3-dimensional coordinate system (X-Y-Z) while the sensing device 110 may accordingly move in space and capture in real time a stereoscopic image or video of the scene from all possible angles and locations. In accordance with embodiments, there are provided methods and systems for capturing a stereoscopic image or video of the scene 120 and analyzing the captured image or video to detect, for example in real time, whether the cause of discomfort effects or artifacts such as dizziness, nausea, eye-strain (or other visual discomforts) in the captured stereoscopic video or image results from the location and/or speed of the sensing device 110 in respect to objects in the captured scene and/or the location or speed of captured objects in respect to the sensing device.

The system and methods further include presenting the type of the caused effect and guidance in the form of visual and/or voice marks, such as text and/or icons displayed on the screen of device 130 for directing the user in which pose, speed or location to capture the scene.

FIG. 1A illustrates an example of the scene 120 presenting a football stadium including one or more static elements such as football balcony, football field and goalpost 122 as well as moving elements and objects such as a football player 123 and ball 124. In accordance with embodiments, the stereoscopic discomfort module is configured to detect movement, pose and speed, such as horizontal movements (e.g. panning) or vertical movements of objects in the scene 120, for example the football player 123 and/or the ball 124 in respect to the movement, pose and speed of the sensing device 110 and vice versa. As explained above, the system is configured to provide one or more alerts according to the type of caused discomfort. For example, the system may detect that the kicked ball 124 will fly too close to the sensing device or the sensing device is moved to close to the captured scene and alert "dizziness" and/or "step back" and/or "step back one meter".

Figure 1B:
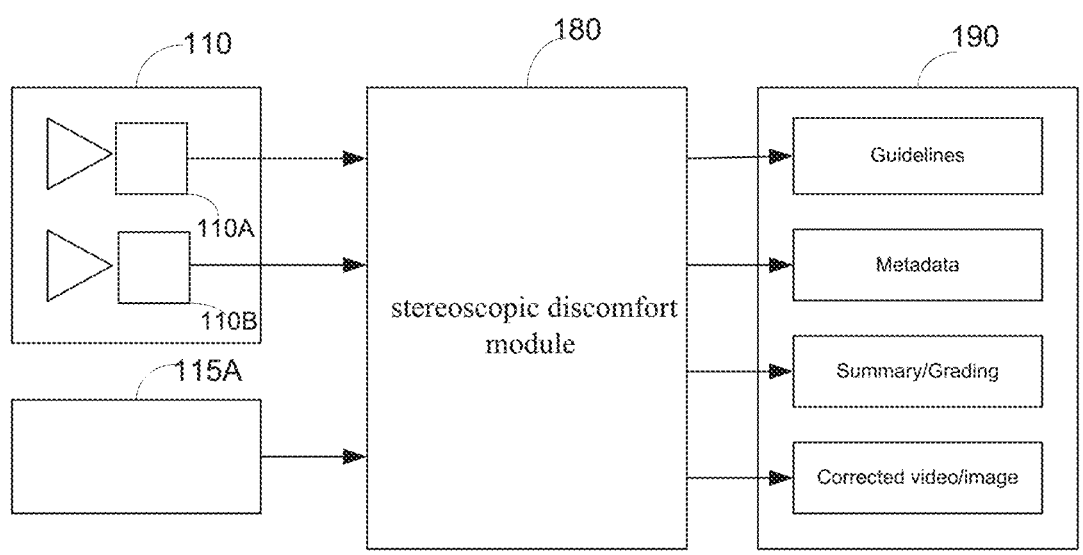
FIG. 1B shows a high level block diagram of the system of FIG. 1A, in accordance with embodiments.

FIG. 1B shows a high level block diagram of system 100, in accordance with embodiments. The data streams (e.g. left and right) of cameras 110A and 110B are transmitted to the stereoscopic discomfort module 180 configured to analyze and synchronize, for example in real-time, the data streams. Optionally or in combination, the data streams and measurements data of the measurement unit are transmitted to the stereoscopic discomfort module 180 for time synchronizing the data streams with a measurements data to yield for example a location and/or time stamp for each frame of the left and right data streams.

Figure 4:
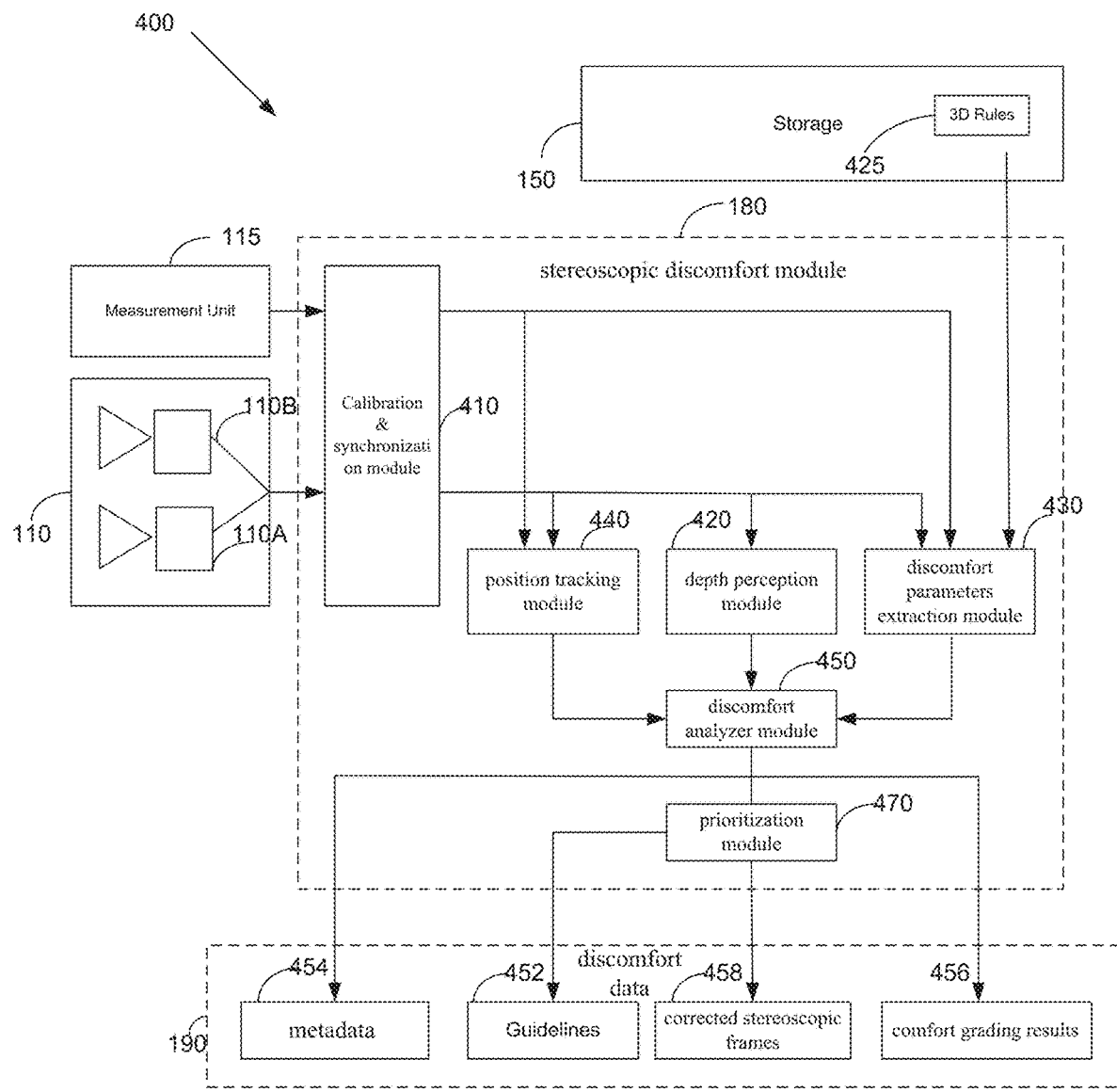
FIG. 4 is a block diagram of a system illustrating further details of the stereoscopic discomfort module, in accordance with embodiments.

According to some embodiments, following the synchronization and analysis of the data streams the stereoscopic discomfort module 180 is configured to yield a stereoscopic discomfort data 190 including guidelines, metadata, summary and corrected video/images, as will be illustrated in details in respect to FIG. 4. In some cases the guidelines comprise parameters to assist and guide a 3D photographer, for example in real-time while he is imaging the scene to enhance the stereoscopic video imaging experience and provide a professional stereoscopic output. The guidelines include instructions such as how and from which preferred locations and positions to image the scene to generate a stereoscopic video which is comfort to watch, e.g. doesn't include discomfort artifacts such as dizziness, nausea, eye-strain, etc.

Figure 1C:
FIG. 1C shows one or more guidelines presented on a display of a mobile device in accordance with embodiments.

In some cases, the guidelines may be presented on a display, such as a 3D near eye display to assist and direct the user in real-time while imaging the scene. According to some embodiments the guidelines may be displayed in the form of text and/or voice and/or one or more icons. As illustrated in FIG. 1C one or more guidelines 191 including for example a visual text alert to a user, for example 'step back' may be presented on a display 197 of a mobile device 193.

In some cases, the data streams (e.g. left and right data streams) analysis may further include providing metadata which includes total comfort watching grading. Specifically, the metadata may be superposed on one or both data streams as a video form (e.g. MP4, or other format) to grade each or some frames according to their discomfort level, e.g. low grading for frame or images which are not imaged according to the respective guidelines and high grading for video or images which are imaged according to the stereoscopic imaging guidelines.

Figure 2:
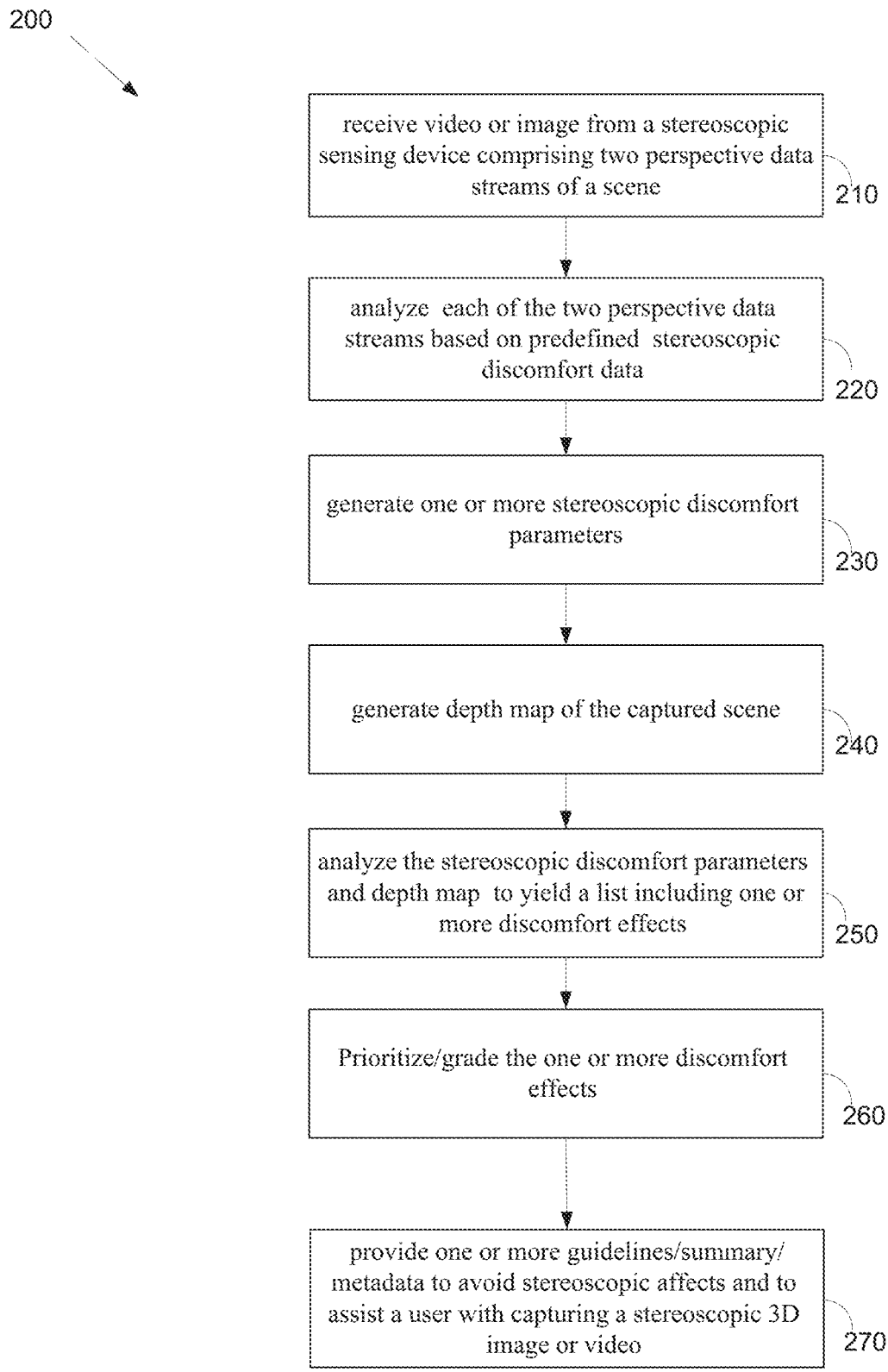
FIG. 2 illustrates a flowchart of method for detecting and/or preventing stereoscopic artifacts in a captured stereoscopic image or video in accordance with embodiments.

FIG. 2 illustrates a flowchart of method 200 for detecting and/or preventing stereoscopic artifacts such as discomfort artifacts in a captured stereoscopic image or video of a scene and to assist a user in capturing 3D image or video of the scene, in accordance with embodiments. System 100, for example, may be used to implement method 200. However, method 200 may also be implemented by systems having other configurations. At step 210 a video 120' or image of the scene 120 as captured for example by the stereoscopic sensing device 110 may be received at device 130. The video 120' comprises two perspective data streams of the scene 120. In some cases, the video 120' may be displayed for example on the display 160 (e.g. preview display) of device 130 to allow the user to visualize what image can be currently captured. At step 220 each of the two perspective data streams are analyzed, for example consecutively, based on predefined stereoscopic discomfort data rules to generate at step 230 one or more stereoscopic discomfort parameters. At step 240 a depth map of the captured scene is provided, for example by the stereoscopic discomfort module 180 based on the two perspective data streams. At step 250 the stereoscopic discomfort parameters and the depth map are analyzed, for example by a discomfort analyzer module to yield a stereoscopic discomfort data including for example one or more stereoscopic imaging effects such as discomfort effects which were detected in the captured frames. Optionally, at step 260 the discomfort effects are prioritized by for example grading the analyzed discomfort effect. For example a discomfort effect relating to discomfort effects casing nausea will get a higher grade than other discomfort effects such as discomfort effects causing eye stress. At step 270, one or more guidelines and/or summary and/or metadata are provided by the stereoscopic discomfort module including information on caused stereoscopic artifacts and providing data to assist a user to capture a stereoscopic 3D video of said scene. In some cases the guidelines may include visual indications such as indications 165 which may be displayed on display 160. In some cases the discomfort effects may be corrected as will be illustrated herein in respect to FIG. 5. In some cases, based on the analyzed discomfort effect type and respective grading and/or a computation budget the discomfort effects are prioritized to select which discomfort effect to be presented to the user and/or which discomfort effect to be corrected.

Figure 3:
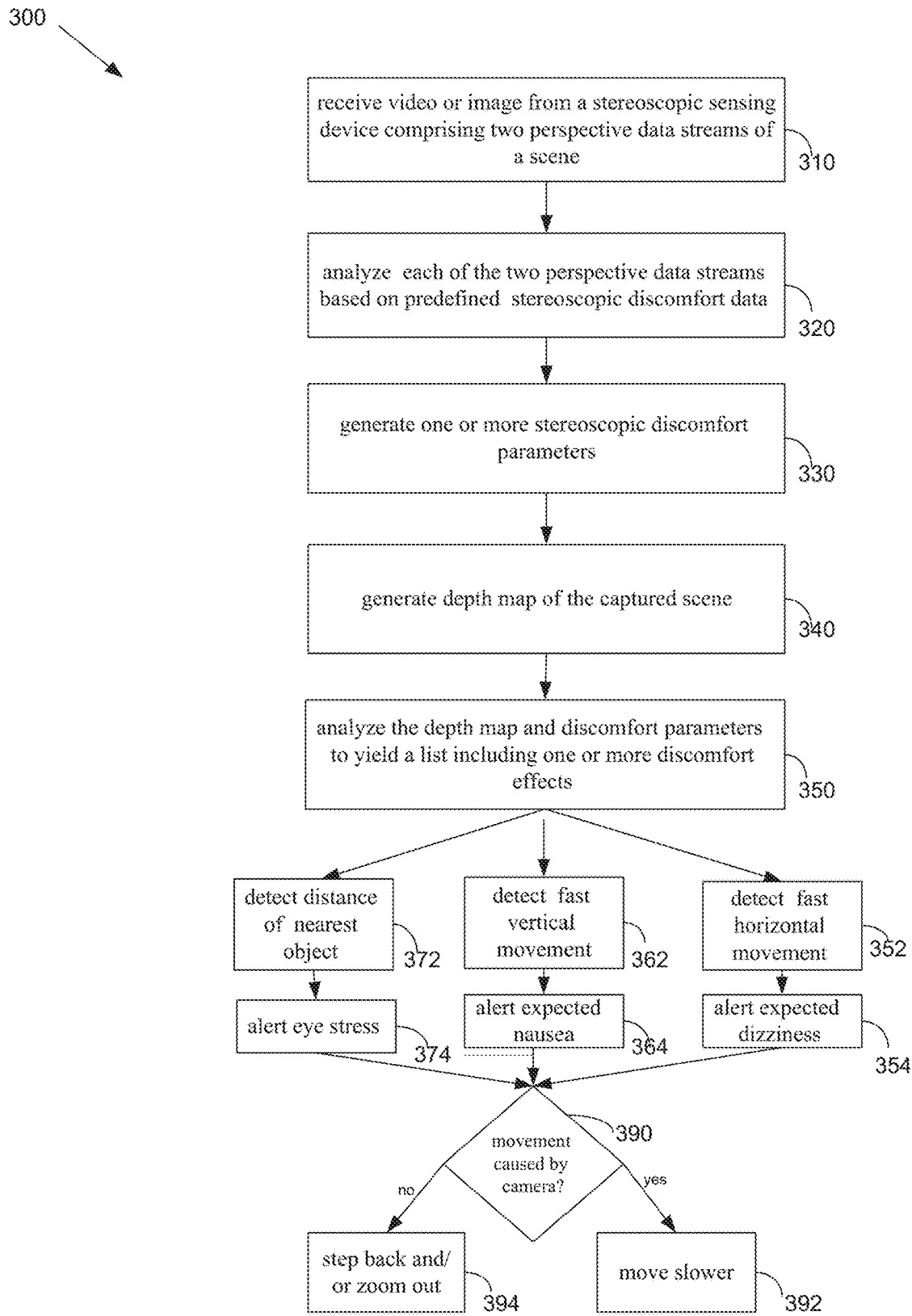
FIG. 3 illustrates an example of method for detecting and/or preventing stereoscopic artifacts such as dizziness, nausea, and eye stress in a captured stereoscopic image or video in accordance with embodiments of the present invention.

FIG. 3 illustrates an example of method 300 for detecting and/or preventing stereoscopic artifacts such as dizziness, nausea, and eye stress in a captured stereoscopic image or video of a scene and to assist a user in capturing 3D image or video of the scene in accordance with embodiments. System 100, for example, may be used to implement method 300. However, method 300 may also be implemented by systems having other configurations. At step 310 the device 130 may receive a video 120' or image of scene 120 as captured, for example by the stereoscopic sensing device 110. The video 120' comprises two perspective data streams of the scene 120. In some cases, the video 120' may be displayed for example on the display 160 (e.g. preview display) of device 130 to allow the user to visualize what image can be currently captured. At step 320 the processor analyze each of the two perspective data streams, for example consecutively, based on predefined stereoscopic discomfort data stored for example in memory storing instructions executable by the processor to generate at step 330 one or more stereoscopic discomfort parameters. In some cases the predefined stereoscopic discomfort data rules comprise one or more parameters related to the cause of dizziness, nausea, and eye stress in a captured stereoscopic image of video. Non-limiting examples of such parameters include: gap between the stereoscopic camera and captured targets, camera velocity, target velocity. At step 340 a depth map of the captured scene is provided, for example by the processor based on the two perspective data streams. At step 350 the depth map and discomfort parameters are analyzed to yield a list including one or more discomfort effects which were detected in the captured frames.

In some cases the analysis of step 350 comprises at step 352 detecting a fast horizontal movement (e.g. panning) and accordingly at step 354 alerting expected dizziness effects. Specifically, the detection includes analyzing the captured video to detect at step 390 if the movement is caused by the stereoscopic camera and therefore direct the user at step 392 to pan slower or if it is caused by one or more captured objects in the scene moving fast and therefore direct the user at step 394 to step back and/or zoom out.

In some cases the analysis comprises at step 362 detecting a fast vertical movement and accordingly at step 364 alerting expected nausea effects. The detection includes analyzing the captured stereoscopic video to detect at step 390 if the movement is caused by the stereoscopic camera and therefore alert the user at step 392 to move slower or if it is caused by one or more captured objects in the scene moving fast and therefore direct the user at step 394 to step back and/or zoom out.

In some cases, the analysis comprises at step 372 detecting vergence—accommodation conflict effect which causes eye stress while viewing the captured stereoscopic video of a scene and accordingly at step 374 alerting expected eye stress effects. The detection includes analyzing the captured stereoscopic video to detect a distance of a nearest object in the captured scene from the stereoscopic sensing device. The detection further includes at step 390 analyzing the captured video to detect if the movement is caused by the stereoscopic camera and therefore direct the user at step 392 to move slower or if it is caused by one or more captured objects in the scene moving fast and therefore direct the user at step 394 to step back and/or zoom out.

FIG. 4 is a block diagram of a system 400 illustrating further details of the stereoscopic discomfort module 180, in accordance with embodiments. The module 180 may comprise a calibration and synchronization module 410 configured to receive the left and right data streams from sensors 110A and 110B and accordingly time synchronize the data streams.

Additionally the calibration and synchronization module 410 is configured to perform optical adjustments between the received left and right data streams such that the output of the left and right data streams as will be projected on the 3D display are optically synchronized. The optical adjustments may include for example brightness and/or contrast and/or sharpness, and/or color and/or focus area adjustments between the data streams. In some cases, the optical adjustments may further include specific optical adjustments to in scene objects such as size adjustments (FOV correction) etc.

According to some embodiments the calibration and synchronization module 410 is further configured to geometrically calibrate the received left and right data streams such that that objects will appear in the same size and in the same video line numbers at the same frame.

According to some embodiments, the calibrated and synchronized data streams are transmitted to a depth perception module 420 for processing the calibrated and synchronized data streams and generating a depth map of the captured scene. The depth map may include 3D data such as the size and distance of in-scene detected objects from the sensing device 110, for example per each frame or substantially per each frame.

According to some embodiments, the calibrated and synchronized data streams are transmitted to a discomfort parameters extraction module 430 for processing the calibrated and synchronized data streams and providing one or more discomfort parameters indicators defining for example for one or more frames (e.g. for each frame) whether the received processed data streams (e.g. left and right) are in line with predefined stereoscopic discomfort data rules 425 (e.g. 3D video photography rules) to allow a 3D reconstruction of the scene which is comfort to watch and doesn't include artifacts such as stereoscopic artifacts. The predefined stereoscopic discomfort data rules include for example: maximum speed of objects in pixels/frame relative to its size in pixels and are extracted by analyzing for example the sensor resolution, light conditions and focus condition as captured by the sensor.

In some cases, predefined stereoscopic discomfort data rules 425 may be predefined 3D video photography rules stored for example at memory storage 150.

According to some embodiments, the calibrated and synchronized data streams are transmitted to a position tracking module 440 configured to track and find the position of the stereoscopic sensing device 230 in space in respect to, for example the sensing device 110 or the user. For example, the position tracking module 440 may analyze each frame of the synchronized data streams and extract the location of the sensing device 130.

Alternatively or in combination, the position tracking module 440 may receive location measurement data including for example the sensing device position in space as measured for example by the one or more measurement units 115 (e.g. IMU) and process the received location measurement data (e.g. IMU parameters) with the video data streams to yield for each frame the location (position and orientation) of the sensing device 110. In some cases the sensing device 110 location in space may include the sensing device location in six degrees of freedom (6DoF) per frame.

In accordance with embodiments, the system 400 further comprises a discomfort analyzer module 450 configured to receive and process the depth map of the captured scene, the measured position of the sensing device and discomfort parameters to yield stereoscopic discomfort data 190. Non-limiting examples of parameters analyzed and detected by module 450 include parameters related to the scene such as: relative size of an object; distance of objects from camera; location of objects in the frame; depth movements. Additionally the parameters include camera related parameters such as: stability; panning movement; up and down movement; in depth movements.

According to some embodiments, the stereoscopic discomfort data 190 comprises one or more guidelines 452 to assist the user with capturing the scene and/or direct the user, for example in real time, to specific locations where the 3D video should be captured and/or in which specific position to hold the stereoscopic sensing device to avoid discomfort artifacts in the captured 3D video. Specifically, the guidelines 452 may include info such as how a 3D video should be captured to avoid stereoscopic artifacts, such as discomfort effects by indicating the, pose, speed and direction the user should hold the stereoscopic sensing device 110 and capture the scene.

According to some embodiments the stereoscopic discomfort data 190 is configured to provide metadata 454 including for example a total comfort viewing grade of the captured 3D video. Specifically, the metadata 454 may include instantaneous comfort level, e.g. every second that is added as metadata information to the 3D video. The grade may be determined based on the analyses of the complete or selected parts of the captured stereoscopic video.

In some cases, the total comfort viewing grading may be presented numerically or in other form. For example a high rank (e.g. '100' or 'A') for a resulted professional 3D video and low rank ('0' or 'D') for a poorly captured stereoscopic video which as result of not following the 3D imaging guidelines may not be displayed. The 454 may be added to the 3D imaged video in an MP4 format or any known in the art video format. In some cases the metadata may be stored in a local database or external database such as a local cloud According to some embodiments the stereoscopic discomfort data 190 includes comfort grading results 456 for each captured stereoscopic frame or for a set of captured stereoscopic video frames, for example to a set of sequential captured video frames. The grading results indicate the comfort and/or discomfort level of each or a plurality of captured stereoscopic frames. In some cases the comfort grading results 456 may include a detailed report including for example detailed comfort grading results. In some cases the comfort grading results 456 may include a summary status for each frame indicating the comfort level of each captured frame, for example in text format such as 'low'- indicating the captured frame includes discomfort artifacts, or 'high' indicating the captured frame doesn't include any discomfort artifacts.

According to some embodiments the stereoscopic discomfort data 190 is configured to correct the captured stereoscopic images or video by eliminating discomfort effects included in the captured frames and generate corrected stereoscopic frames 458.

According to some embodiments, the module 180 may include a prioritization module 470 configured to prioritize if and which discomfort effect to be notified the user. Alternatively or in combination the prioritization module 470 is configured to prioritize if and which discomfort effect to be corrected. For example the prioritization module 470 may receive the depth map of the captured scene, the measured position of the sensing device and discomfort parameters and rank one or more frames (e.g. all frames) based on the type of discomfort effect and the discomfort level. For example dizziness effects will gain high grade while eye-strain effect will gain low grade, therefore some eye strain effects included in a number of frames will not be notified to the user while small dizziness effects will be notified.

Figure 5:
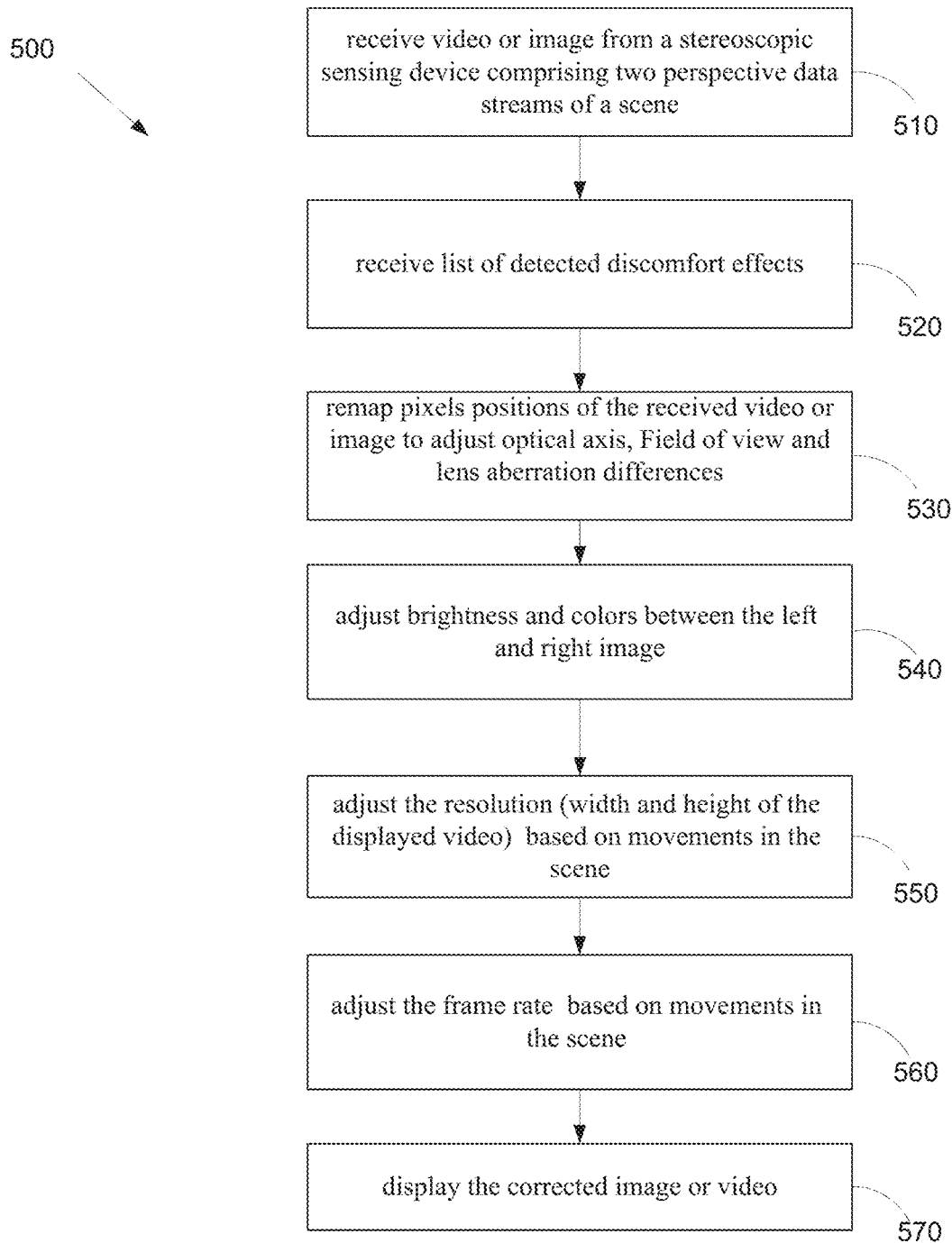
FIG. 5 illustrates a flowchart of method for correcting the captured stereoscopic images or video and generating corrected stereoscopic frames, in accordance with embodiments.

FIG. 5 illustrates a flowchart of method 500 for correcting the captured stereoscopic images or video and generating corrected stereoscopic frames, in accordance with embodiments. System 100 or one or more processors such as processing units 140, for example, may be used to implement method 500. However, method 500 may also be implemented by systems or processors having other configurations. At step 510 a video 120' or image of the scene 120 as captured for example by the stereoscopic sensing device 110 may be received at device 130 or/and by processor units 140. The video 120' comprises two perspective data streams of the scene 120 (e.g. left and right images). At step 520 a list of detected discomfort effects, such as discomfort effects detected by the discomfort module are received. At step 530 the pixels positions of the received video or images are remapped, for example based on detected discomfort effects, to adjust the optical axis, the Field of View and lens aberration differences of the received video or images. At step 540 the brightness and colors between the left and the right images or video are adjusted. At step 550 the resolution (width and height of the displayed video) is adjusted based on movements in the scene and/or the detected discomfort effects. At step 560 the frame rate is adjusted based on movements in the scene and at step 570 the corrected image of video is displayed, for example on the display 160.

In further embodiments, the processing unit may be a digital processing device including one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the system disclosed herein includes one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device.

In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media. In some embodiments, the system disclosed herein includes at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof. In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the system disclosed herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the system disclosed herein includes one or more databases, or use of the same. In view of the disclosure provided herein, those of skill in the art will recognize that many databases are suitable for storage and retrieval of information as described herein. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. Methods of the present invention may be implemented by performing or completing manually, automatically, or a combination thereof, selected steps or tasks.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A device connectable to a portable computing platform having a processor, the device comprising:
   a stereoscopic camera comprising two cameras, the cameras located at a distance from one another, wherein the stereoscopic camera is configured to provide two perspective data streams of a scene, and wherein the processor is configured to:
      analyze the two perspective data streams based on predefined stereoscopic discomfort data rules to yield one or more stereoscopic discomfort parameters, wherein the predefined stereoscopic discomfort data rules are related to the cause of dizziness or nausea or eye stress in a captured stereoscopic image;
      provide a depth map of said scene based on the two perspective data streams;
      provide a stereoscopic discomfort module, said stereoscopic discomfort module is configured to:
         analyze said depth map to detect the movement of said stereoscopic camera;
         identify at least one item of stereoscopic discomfort data related respectively to said detected movement and said one or more stereoscopic discomfort parameters; and
         alert a user in real time based on said at least one item of identified stereoscopic discomfort data while said user captures a stereoscopic 3D video of said scene that includes the two perspective data streams.

2. The device of claim 1 wherein the device is connectable to a display and wherein the at least one item of stereoscopic discomfort data is displayed on said display.

3. The device of claim 2 wherein said at least one item of stereoscopic discomfort data comprise one or more alerts, said alerts indicating one or more predicted discomfort artifacts.

4. The device of claim 2, wherein the display is a headset display.

5. The device of claim 4 wherein the display is a virtual reality headset.

6. The device of claim 1 comprising one or more measurements units configured to measure the position of the stereoscopic camera and yield location measurement data, and wherein the processor is configured to process the location measurement data from the two perspective data streams to extract for each frame of the data streams the position and orientation of the stereoscopic camera, and wherein said at least one item of stereoscopic discomfort data is identified based on said extracted position and orientation of the stereoscopic camera and said one or more stereoscopic discomfort parameters.

7. The device of claim 6 wherein said one or more measurement units are Inertial Measurement Units (IMU) configured to detect and provide said location measurement data, and wherein said location measurements data comprise the device linear acceleration and rotational rate.

8. The device of claim 6 comprising a prioritization module configured and enabled to:
   receive the depth map of the captured scene, the measured position of the stereoscopic camera and said one or more stereoscopic discomfort parameters and rank one or more frames of two perspective data streams of a scene based on the type of said at least one identified discomfort effect and the discomfort level.

9. The device of claim 8 wherein said prioritization module is configured and enabled to prioritize which discomfort effect to be notified the user and which discomfort effect to be corrected.

10. The device of claim 1 wherein said stereoscopic discomfort module is configured to:
    detect a movement of one or more objects in the scene towards or away from the stereoscopic camera in the respective optical axis;
    identify at least one item of stereoscopic discomfort data related respectively to said detected movement of one or more objects and said one or more stereoscopic discomfort parameters; and
    detect whether the movement is caused by the stereoscopic camera or if it is caused only by one or more captured objects in the scene.

11. The device of claim 10 wherein said movement of one or more objects in the scene is a movement towards or away from the stereoscopic camera, and wherein the movement is detected by analyzing the rate of change in the depth map within consecutive frames of said two perspective data streams of the scene.

12. The device of claim 1 wherein said stereoscopic discomfort module is configured to:
    compute shakes or vibrations of the stereoscopic camera; and
    identify said at least one item of stereoscopic discomfort data based on said computed shakes or vibrations of the stereoscopic camera and said one or more stereoscopic discomfort parameters.

13. The device of claim 1 wherein said at least one item of stereoscopic discomfort data comprises one or more guidelines.

14. The device of claim 13 wherein said guidelines comprise one or more visual indicators or voice indicators.

15. The device of claim 14 wherein said visual indicators are selected from the group consisting of: arrows; speed scale; textual alerts; or guidance.

16. The device of claim 1 wherein said detected movement is a fast horizontal movement of said stereoscopic camera and said identified at least one stereoscopic discomfort effect is dizziness, and wherein the stereoscopic discomfort module is configured and enabled to alert said user in real time on expected of said dizziness while said user captures a stereoscopic 3D video of said scene.

17. The device of claim 16 wherein the stereoscopic discomfort module is further configured and enabled to:
    detect a distance of close object in the captured scene from the stereoscopic sensing device;
    analyze the two perspective data streams to detect if the movement is caused by the stereoscopic camera and direct the user to move slower or if it is caused by the close object and therefore direct the user to step back or zoom out.

18. The device of claim 1 wherein said detected movement is a fast vertical movement of said stereoscopic camera and said identified at least one stereoscopic discomfort effect is nausea, and wherein the stereoscopic discomfort module is configured and enabled to alert said user in real time on expected of said nausea while said user captures a stereoscopic 3D video of said scene.

19. The device of claim 1 wherein the predefined stereoscopic discomfort data rules include maximum speed of objects in pixels or frame relative to the object's size.

20. The device of claim 19 wherein the predefined stereoscopic discomfort data rules are extracted by analyzing one or more of the stereoscopic camera resolution, light conditions and focus condition.

\* \* \* \* \*